United States Patent [19]
Enomoto et al.

[11] Patent Number: 5,620,258
[45] Date of Patent: Apr. 15, 1997

[54] PRESS DIE SET AND PRESS MACHINE FOR DRIVING IT

[75] Inventors: Nobuo Enomoto; Mitsuji Hosoda; Toshio Wada; Kazuyoshi Umeya; Koki Okanda, all of Yamanashi-ken, Japan

[73] Assignee: Enomoto Co., Ltd., Yamanashi-ken, Japan

[21] Appl. No.: 536,611

[22] Filed: Sep. 29, 1995

Related U.S. Application Data

[62] Division of Ser. No. 214,617, Mar. 18, 1994.

[30] Foreign Application Priority Data

| Mar. 26, 1993 | [JP] | Japan | 5-092373 |
| Oct. 28, 1993 | [JP] | Japan | 5-062774 U |
| Nov. 15, 1993 | [JP] | Japan | 5-308629 |
| Nov. 18, 1993 | [JP] | Japan | 5-066429 U |

[51] Int. Cl.$^6$ .................................................. F16C 29/04
[52] U.S. Cl. .............................................................. 384/47
[58] Field of Search ........................ 384/47, 619, 44, 384/551, 572

[56] References Cited

U.S. PATENT DOCUMENTS

| 3,236,569 | 2/1966 | Moosmann | 384/47 |
| 5,251,984 | 10/1993 | Mottate | 384/47 |
| 5,363,741 | 11/1994 | Takada et al. | 384/47 |

*Primary Examiner*—Lenard A. Footland
*Attorney, Agent, or Firm*—Brumbaugh, Graves, Donohue & Raymond

[57] ABSTRACT

The bottoms 225 of circumferential groove 22 are equidistant from the axis of rotation 215 and constitute the sides of the column, the axes of rotation of which are common. The sides 226 and 227 of the circumferential groove 22 are not normal to the axis of rotation 215, and are beveled to form an acute angle to the bottom 225. That is, the sides 226 and 227 of the circumferential groove 22 form sides of cones the axes of rotation of which are common. The width of the circumferential groove 22 becomes widened from the surface to the inside. Resin 26 is coated on the surface of the circumferential groove 22 in such a manner that the coated surface has a substantially constant width. In this embodiment, a nylon type resin is coated with little peeling-off during use of the roller.

4 Claims, 14 Drawing Sheets

PRESS DIE SET AND PRESS MACHINE FOR DRIVING IT

This application is a division of application Ser. No. 08/214,617 filed on Mar. 18, 1994.

BACKGROUND OF THE INVENTION

1. Field of the Invention

This invention relates to an improvement in a press die set, and an improvement in a press machine for driving it.

2. Disclosure of the Prior Art

A press die set, as shown in FIG. 14, has two thick plates, one at the top and the other at the bottom. The upper plate (punch holder) is mounted with a cylindrical guide bush 31. The lower plate (die holder) is mounted with a columnar guide post 33. A retainer 32 is cylindrical, through which the guide post 33 passes, and on the outer side of which the guide bush 31 contacts. The guide bush 31, the retainer 32, and the guide post 33 guidesmoothvertical sliding of the upper plate (punch holder) while maintaining a parallel relationship with the lower plate (die holder).

Conventionally, a ball retainer as shown in the figure has been widely used as the retainer. The ball retainer 70 rotatably holds a number of ball bearings 702 in a substantially cylindrical plastic case 701. The thickness of the case 701 is made smaller than the diameter of ball bearings 702 so that the ball bearings are caused to pass through the inside of the case, and contact the guide post, but the case does not contact the guide post. Similarly, the ball bearings contact the guide bush which surrounds and slides around the outside of the ball retainer. Then, as the ball bearings rotate, the guide post, the ball retainer, and the guide bush mutually slide.

A conventional guide post is a column the outer diameter of which is slightly smaller than the inner diameter of the retainer. In addition, a conventional guide bush is a cylinder the inner diameter of which is slightly larger than the outer diameter of the retainer. Lubricant such as grease is applied between the ball bearings and the guide post or the guide bush for a smooth sliding motion.

In addition, as shown in FIG. 2, components relating to a stripper are mounted near the center of each plate. The upper plate (punch holder) is mounted with a columnar stripper guide pin 35 with a small diameter. The lower plate (die holder) is mounted with a cylindrical die guide bush 36. A planar stripper 39 is mounted with a cylindrical stripper guide bush 34, and a hole at its center through which the blade of a trimming punch 37 passes. A substantially cylindrical trimming die button 38 with a recess of a small diameter is mounted at the center of a plate mounted in parallel to the lower plate. The stripper guide bush 34 of the stripper 39 is inserted through near the center of the stripper guide pin 35 the end of which the die guide bush 36 mounted on the lower plate passes through.

A manner to stamp a plate work by using the above press die set will be described. The hole in the top surface of the trimming die button 38 has a substantially same shape as the trimming punch 37, but slightly larger in its size to provide a gap or clearance. A hole with a shape and size determined by the dimensions of the trimming punch 37 and the trimming die button 38 is formed in the work by placing it on the trimming die button 38, and lowering the trimming punch 37.

A conventional press machine for driving the press die set will be described. As shown in FIG. 1, a planar bolster is placed across the receiver of a press machine, and a die holder is mounted on the bolster. The die holder is also planar. There is a planar ram over the press machine. The ram vertically slides, and a bearing is interposed between the end plate of the ram and the frame of the press machine. A punch holder is mounted under the ram. The punch holder is also planar. Conventionally, all of the bolster, the die holder, the punch holder, and the ram are of casting iron or iron-base alloy. The receiver of the press machine horizontally and inwardly projects from the frame. That is, a large space is formed at the center.

OBJECTS AND SUMMARY OF THE INVENTION

However, because the conventional retainer is one utilizing ball bearings, it has point contact with the guide post and the guide bush. Even if the number of ball bearings is increased, the total contact area is still small. Therefore, high pressure is imposed on the ball bearings, which leads to scratching of the guide post, loss of lubricant film, generation of heat, and, at the worst case, seizure.

Furthermore, it point contacts the individual ball bearings so that play is apt to occur, thus degrading accuracy, and it has too high a degree of freedom, making adjustment of position difficult.

In addition, the conventional retainer has a high frictional resistance so that a large force is required to perform sliding motion of the press die set. Moreover, because the ball bearings are obliquely arranged, the relative motion between the guide post and the retainer tends to be in the oblique direction. This is also true in the relative motion between the guide bush and the retainer. Then, the motion of press die set is not real vertical motion, but is added with a rotational motion resulting in a spiral motion or precession motion. Thus, there arises the first problem that undesirable lateral force is imposed on a trimming punch blade or the like thus promoting damage or uneven wear.

Thus, an object of this invention is to overcome the above problem and to provide a new press die set preventive of failure during operation, easily adjusted for position, and high in accuracy.

In addition, conventionally, both the holder for a plain roller bearing and that of a cross roller bearing are metal. When such conventional plain or cross roller bearing is used in a high speed linear reciprocating motion in the vertical direction, the weight of metal holder affects the roller so that the side, top or bottom surface of the roller or the holder tends to be worn, and metal powder is easily generated. Thus, there arises the second problem that the surface of the roller or the guide guiding the roller is easily damaged.

Then, another object of this invention is to overcome the above problem, and to develop new plain and cross roller bearings which can be used in a high speed linear reciprocating motion in the vertical direction.

However, through study on blanking with a press die set, the inventor has found that, in a conventional press die set, in the duration from the time when the trimming punch blade 37 starts to contact to the time when, after completion of blanking, it is released from contact with the work and left from it, the trimming punch blade 37 is unnecessarily moved in the horizontal plane, or in X- and Y- directions. The movement of the blade of the trimming punch in the X- and Y- directions leads to problems such as tipping and damage on the blade of the trimming punch, uneven wear, or, as shown in FIGS. 15 and 16, defective shape or size near the died-out hole in the work. When the blanking is performed under situation where the clearance between the trimming punch blade 37 and the trimming die button 38 becomes uneven, as shown in FIGS. 15 and 16, to make the left clearance tL narrower than the right clearance tR, the shape of hole in the work after blanking becomes: the left side with a relatively larger clearance has large sagging and a small shared surface, while the right side with a relatively smaller clearance have small sagging and a large shared surface, with burrs on the other side.

Moreover, another object of the invention is to overcome the above problem, and to develop a press die set with which uneven wear or damage of the trimming punch blade is unlikely to occur, and which has high accuracy in the shape and size of blanking.

In addition, the inventors have found the following two items by use of the press die machine for a long period of time, and through thorough observation of its behavior.

(1) Heat generated by a press motor and sliding sections of the press is transmitted to the bolster or the ram through lubricating oil and the frame so that the die reaches as high as 58° C. during operation. Thus, there arise problems with heat deformation of the die itself, thus deteriorating the accuracy of blanking, and causing variation from time to time. In addition, even if trouble should occur in the die during operation, it is too hot to touch with bare hands, and therefore, the start of repair is forced to be delayed until after die has been left to cool.

(2) As the ram vertically moves, the ram, the punch holder, the die holder, and the bolster deflects and vibrates. If it persists for a long period of time, the top surface near the top end of the receiver wears to a degree that a gap is caused between the bolster and the receiver when the press machine stands still. Particularly, deflection or lateral shifting of the die holder causes repeated deformation of the hole in the trimming die thus reducing its size when the punch blade is inserted into and removed from the trimming die hole so that the punch blade is worn or damaged.

Furthermore, another object of the invention is to overcome the above problem, and to improve a press machine by developing a punch holder, a die holder, and a bolster having low heat conductivity and excellent rigidity.

As the guide bush slides along the axis of guide post through the plain roller bearing, the upper and the lower dies relatively slide in the vertical direction to perform blanking. When the guide bush performs linear reciprocating motion along the axis of guide post through the plain roller bearing, each roller of the plain roller bearing rolling contacts the first plane provided on the guide post, and, at the same time, rolling contacts the second plane provided on the guide bush.

When the guide bush performs a linear reciprocating motion along the axis of guide post through the plain roller bearing or the cross roller bearing, each roller of the plain roller bearing rolling contacts the first plane provided on the guide post, and at the same time, rolling contacts the second plane provided on the guide bush. In addition, each roller of the cross roller bearing rolling contacts either one of the two planes of the first right angle groove provided on the guide post, and, at the same time, rolling contacts either one of the two planes of the second right angle groove provided on the guide bush.

Each roller is held between the holders of polyvinyl chloride or other resin to be rotatable around the axis of rotation of each roller which is assembled to be parallel to each other.

Each roller is held between the holders of polyvinyl chloride or other resin to be rotatable around the axis of rotation of each roller which is placed in a relationship twisted by 90 deg. with each other.

In the second invention, the spike-like projections stick in the resilient material to prevent the stripper from moving in the X- and Y- directions relative to the die, and to prevent the trimming punch blade from moving in the X- and Y-directions relative to the trimming die button.

In the third invention, the opposing permanent magnets attract each other by the magnetic force to prevent the stripper from moving in the X- and Y- directions relative to the die, and to prevent the trimming punch blade from moving in the X- and Y- directions relative to the trimming die button.

In the fourth invention, the sub-guide pin is inserted into the sub-guide bush for sliding to prevent the stripper from moving in the X- and Y- directions relative to the die, and to prevent the trimming punch blade from moving in the X- and Y- directions relative to the trimming die button.

Absorption of vibration, shutting out of heat, and provision of high rigidity are obtainable by the use of epoxy resin concrete, which is the material for the bolster, the die holder, the ram, and the punch holder.

(1) Because the press die set according to this invention has a structure in which the plane rolling contacts the rollers of the plain roller bearing, it is difficult to damage and caused to generate play. It also has excellent impact resistance. It can therefore maintain its initial accuracy without maintenance for a long period of time, and is suitable for precise linear motion.

(2) Because the press die set according to this invention has a structure in which the plane rolling contacts the rollers of the plain roller bearing, it has almost no resistance to linear reciprocating motion, and its movement is smooth. It therefore causes little temperature rise, and can save driving energy.

(3) Because the press die set according to this invention has a structure in which it moves along a plane, the relative motion between the guide post and the guide bush is pure linear motion, and there is no component of rotary motion in the circumferential direction of the guide post. That is, there is no twist motion nor precession motion. Therefore, it is possible to maintain high accuracy, and to reduce uneven wear and damage.

According to this invention, it is possible to maintain the trimming punch blade not to move in X- and Y- directions in the duration from the time just before the trimming punch blade contacts a work to the time when, after completion of blanking, it is released from the contact with the work and leaves from the work. Thus, the shape and size in blanking can be maintained at high accuracy so that variation can be maintained at a low level. In addition, because the trimming punch blade is little damaged, and uneven wear is hardly generated, it is possible to obtain a significant advantage that little maintenance is necessary for the dieing out press die.

In the press die set according to this invention, the bolster, the die holder, the ram, and the punch holder are all made of epoxy resin concrete with a core consisting of metal rods or metal mesh so that it becomes possible to absorb vibration and heat from the press machine to the press die set, and to prevent deflection of these components themselves. Thus, it is possible to obtain significant advantages in that the accuracy of press working can be further improved, wear of the dieing out press die significantly reduced, and obviation of most maintenance.

DETAILED DESCRIPTION OF THE PREFERRED EMBODIMENTS

Two embodiments of the press die set according to this invention will be described by referring to the attached drawings.

Figure 1:
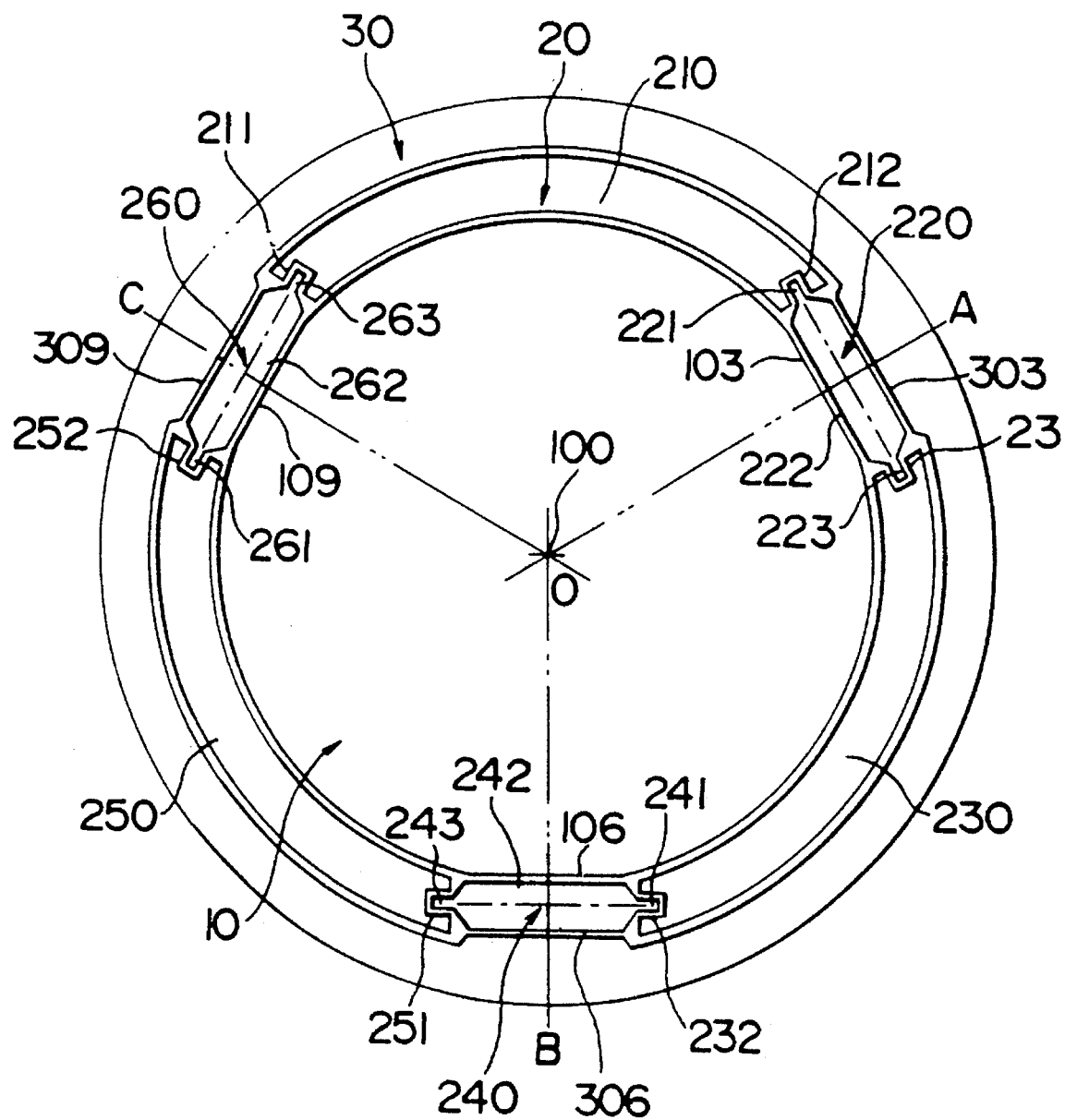
FIG. 1 shows a cross sectional view of a press die set of an embodiment.

FIG. 1 is a cross sectional view of the first embodiment of the press die set. In the first embodiment, three planes are arranged in equal intervals. The press die set according to this invention mainly consists of a guide post 10, a guide bush 30, and a retainer 2.

The guide post 10 is substantially rod-shaped. Formed on its surface are the first planes 103, 106, and 109. They extend parallel to the central axis 100 of the guide post, and normal to the radii OA, OB, and OC, respectively. In this embodiment, the first planes 103, 106, and 109 are three stripes, and arranged at equal intervals of 120 deg. to each other around the central axis of guide post.

Then, the guide bush 30 is substantially cylindrical, and formed with second planes 303, 306, and 309 on its inner surface. They extend parallel to the central axis of the guide bush 30, and normal to the radii OA, OB, and OC, respectively. The second planes 303, 306, and 309 are three stripes, and arranged at equal intervals of 120 deg. to each other around the central axis of the guide bush.

When the guide post 10 is caused to pass through the hollow portion of the guide bush 30, the first planes face the second planes in parallel. In FIG. 1, the first plane 103 faces the second plane 303, the first plane 106 the second plane 306, and the first plane 109 the second plane 309 in parallel. Plain roller bearings 220, 240, and 260 are placed between the first planes and the second planes. Each of rollers 222, 242, and 262 of the plain roller bearing is substantially cylindrical. In this embodiment, the rollers are separately held and maintained between two-piece identical holders made of polyvinyl chloride, and assembled in such a manner that adjacent rollers are in parallel. The roller can freely rotate around its axis of rotation. Because the holder is of polyvinyl chloride, it does not damage the roller and does not generate metal powder. In addition, because, the roller is securely held by the holder, it is difficult to remove from the holder so that the roller has a high degree of freedom in designing its diameter and height. The structure to hold the rollers between the two-piece holders facilitates assembly of the plain roller bearing, providing high work efficiency, and a very low defect rate. Ends 221, 223, 241, 243, 261, and 263 of the holder of the plain roller bearing fit into coupling grooves 211, 212, 231, 232, 251, and 252 at each end of coupling members 210, 230, and 250 of the retainer to constitute the substantially cylindrical retainer 20 as a whole.

Figure 2:
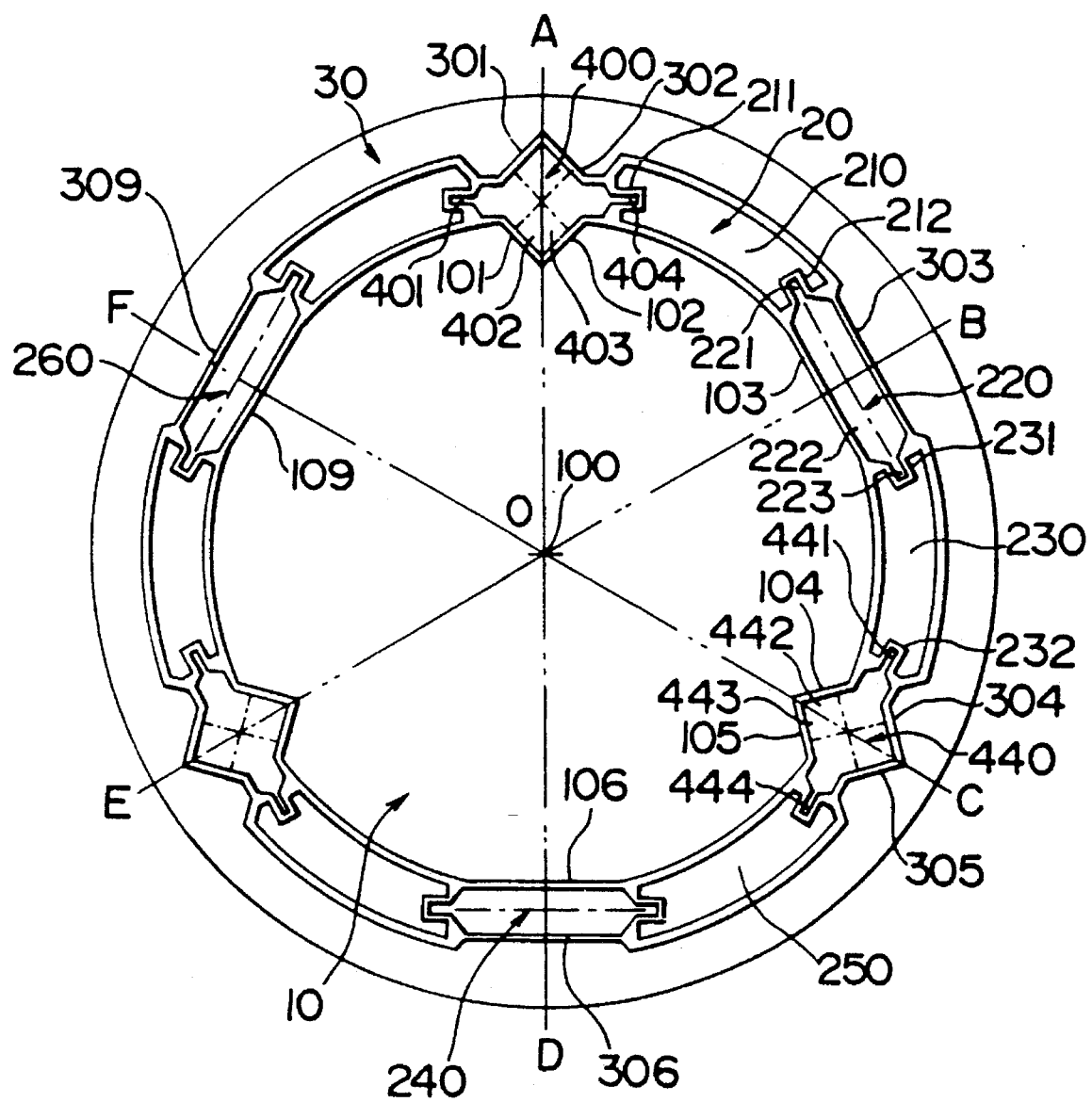
FIG. 2 shows a cross sectional view of a press die set of an embodiment.

FIG. 2 shows a cross sectional view of a press die set according to the second embodiment. The second embodiment is same as the first embodiment except for that first right angle grooves 101, 102, 104, and 105 are three stripes, and arranged at equal intervals of 120 deg. with each other around the central axis of guide post. That is, <AOC, <COE, and <EOA are all 120 deg. In addition, the second right angle grooves 301, 302, 304, and 305 are three stripes, and arranged at equal intervals of 120 deg. with each other around the central axis of the guide post.

Figure 3:
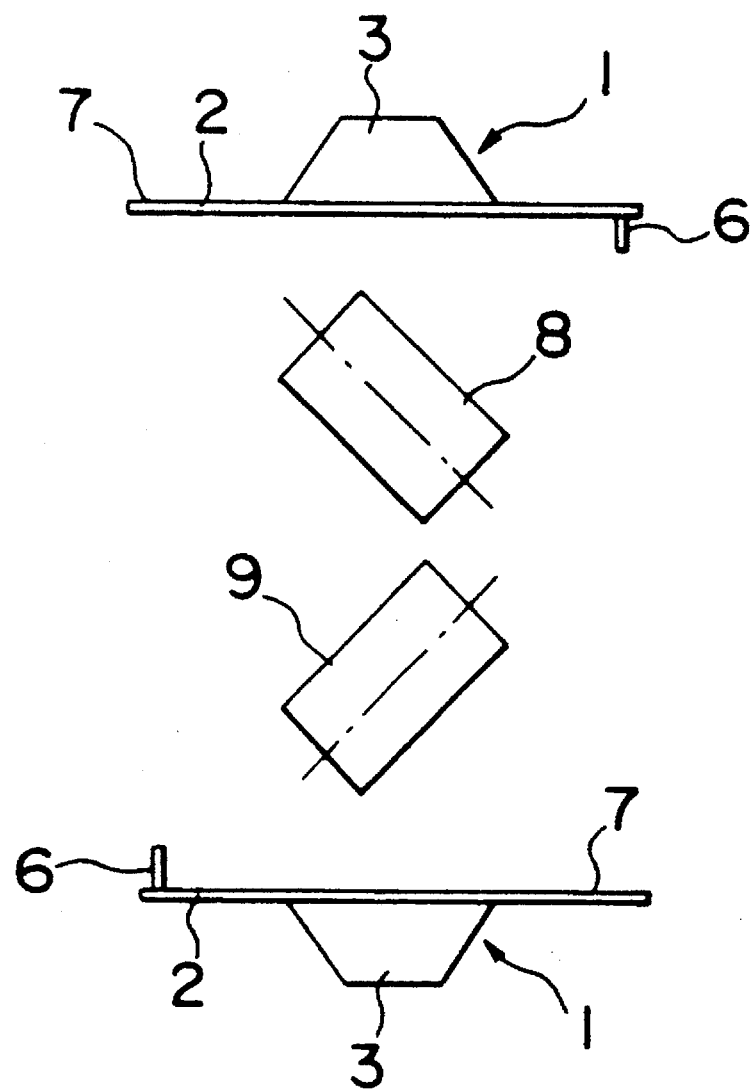
FIG. 3 shows an assembly of an embodiment of cross roller bearing.
Figure 4:
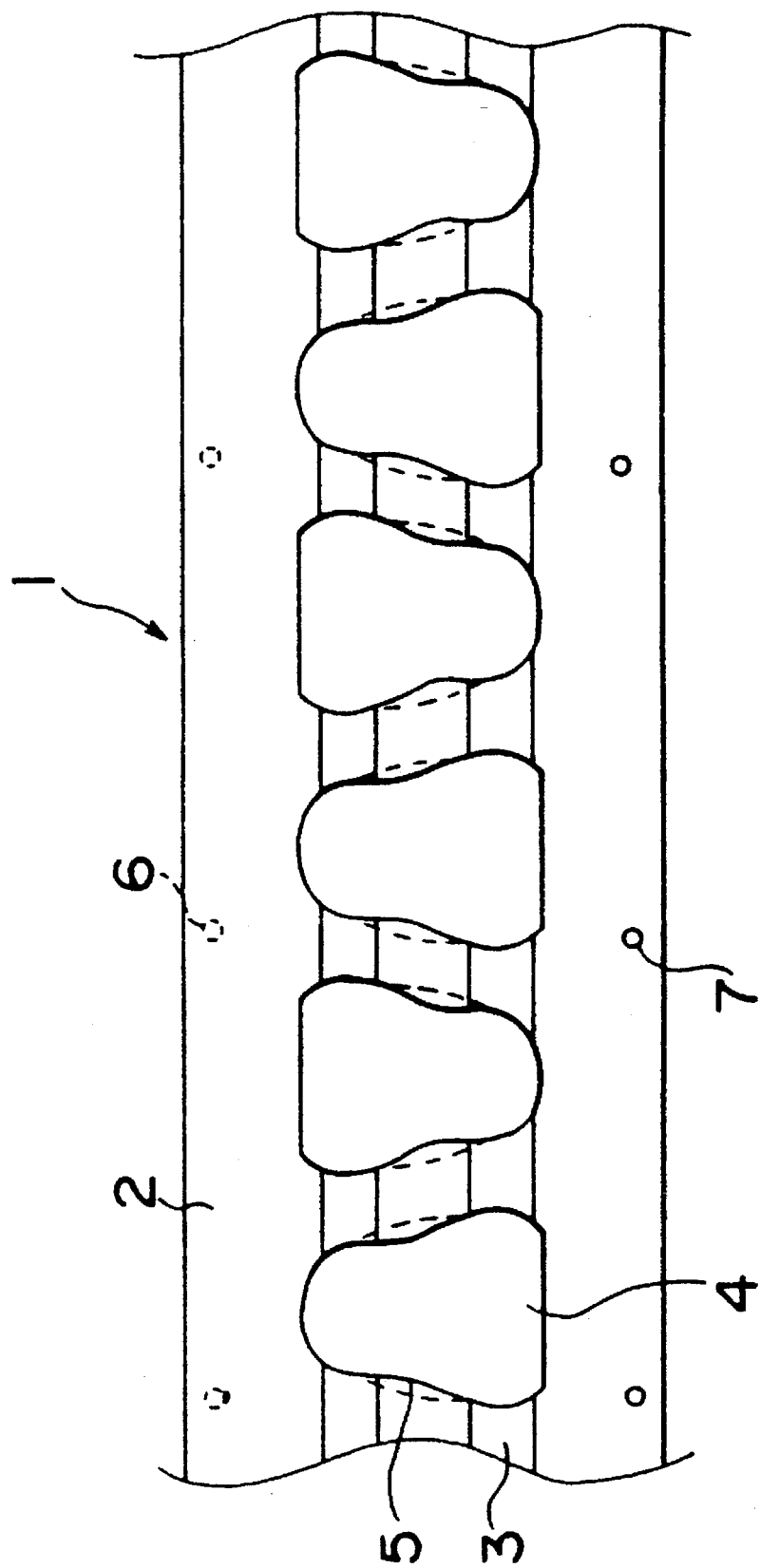
FIG. 4 shows a plan view of an embodiment of cross roller bearing.
Figure 5:
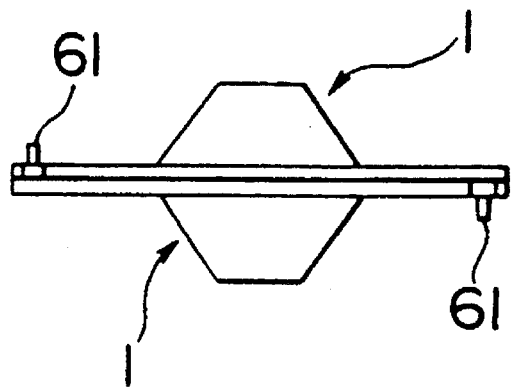
FIG. 5 shows a front view of an embodiment of cross roller bearing during assembly.
Figure 6:
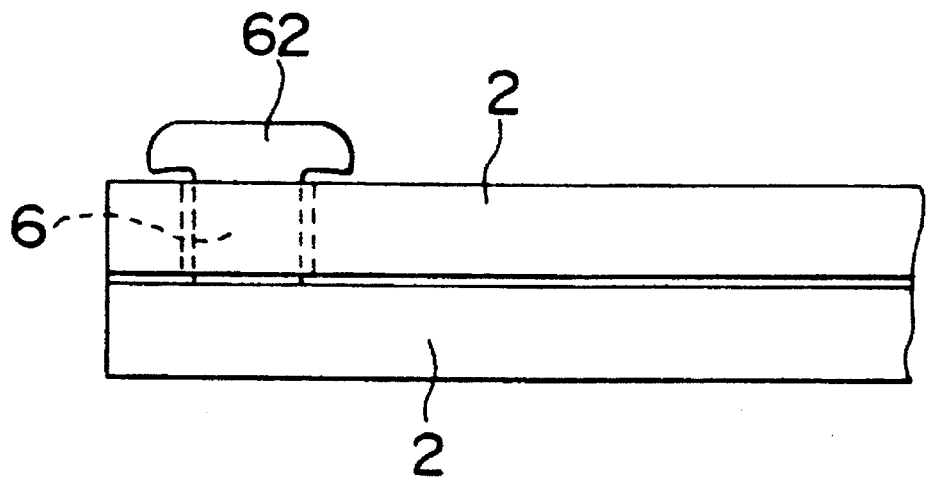
FIG. 6 shows an enlarged view of essential parts of an embodiment of cross roller bearing.
Figure 7:
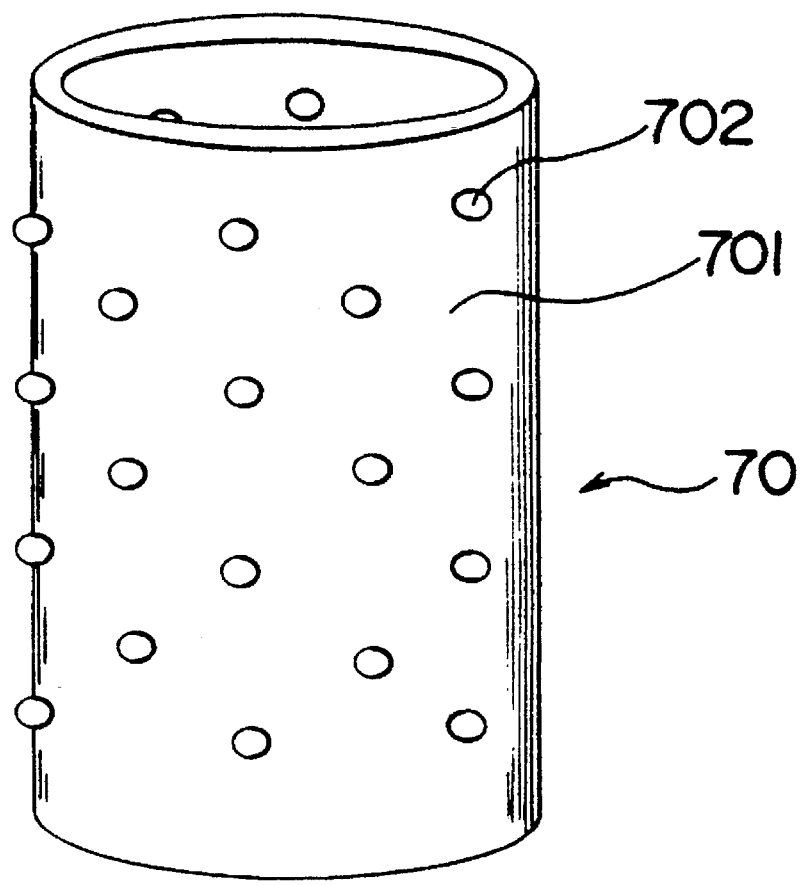
FIG. 7 shows a schematic view of a conventional ball retainer.

FIG. 3 shows an assembly of an embodiment for a cross roller bearing. FIG. 4 shows a plan view of an embodiment of cross roller bearing. FIG. 5 shows a front view of the embodiment of cross roller bearing during assembly. FIG. 6 shows an enlarged view of an essential part of the embodiment of a cross roller bearing. The holder consists of vertically divided two-piece identical members 1. The holder has a roller container 3 at its center which holds rollers 8 and 9 with the holding member 5 so that they are rotatable around their axes, and that the axes of adjacent rollers 8 and 9 are in a twisted relationship of 90 deg. with each other. As shown in FIG. 5, a window 4 is provided in a specific side of this roller container 3 so that the sides of the rollers 8 and 9 contact the guide post or the guide bush. A projection 6 and a hole 7 are provided near the edge of the plate section 2 of the holder. As shown in FIG. 5, after the holder members 1 are piled up and the projection 6 is mated in the hole 7, the front end 61 of the projection 6 is heated and deformed to assemble them so as not to be separated. The heat deformed portion 62 of the projection is as shown in FIG. 6. It is desirable to use polyvinyl chloride type material, nylon type material, polyacetal type material, or oil effusing resin type material as the material of the holder for the cross roller bearing. Because the holder is made of such a material, it does not damage the roller to generate the metal powder. In addition, because the roller is securely held by the holder, it is difficult to remove from the holder, and the roller has a high degree of freedom in designing its diameter and height. The structure to hold the rollers between the two-piece holders facilitates assembly of the plain roller bearing, providing high work efficiency, and very low defect rate.

In addition, to lengthen the sliding stroke, it is necessary to change the bearing in which the rollers are rotatably mounted on the holder to a circulating bearing.

Figure 10:
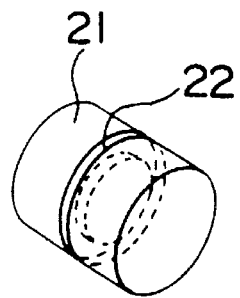
FIG. 10 shows a schematic view of a roller.
Figure 11:
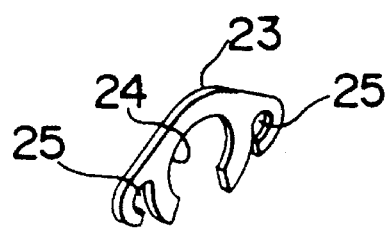
FIG. 11 shows a schematic view of a coupling link.
Figure 12:
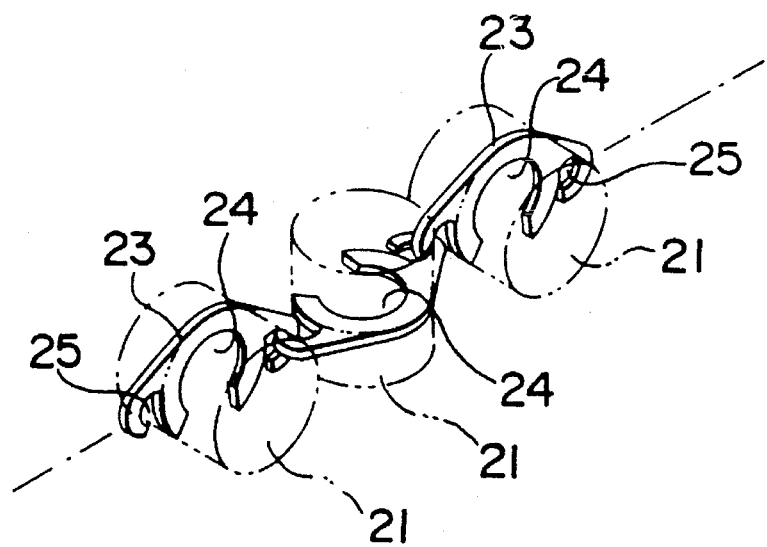
FIG. 12 shows a schematic view of a chain-like cross roller bearing incorporating rollers and a coupling link.

For example, as described in Japanese Utility Model Laid-Open 1-78728, a roller bearing rotatably coupling a number of rollers is known. FIG. 10 shows a schematic view of a roller bearing, FIG. 11 shows a schematic view of a coupling link, and FIG. 12 shows a schematic view of a roller bearing incorporating rollers and a coupling link. The roller 21 is substantially columnar with corners chamfered. A circumferential groove 22 is formed at the center of axis of rotation of the roller 21. The coupling link 23 is of worked metal plate at the center of which a support ring 24 is provided, and at each end of which a connecting ear 25 is provided. The support ring 24 of the coupling link 23 is fitted in the circumferential groove 22 of the roller 21 for allowing free rotation of the roller 21. In addition, the adjacent coupling links are coupled by the coupling ear 25 so that the each roller is coupled in a relationship twisted by 90 deg. to one another. Of course, because they are coupled in a chain by the coupling ear 25, they move in a freely bending manner.

However, because the circumferential groove of the roller and the support ring of the coupling link contact and rotate, they rub each other, generating metal powder and wearing the bottom surface of the circumferential groove in a striated manner, and to wear the support ring, thus causing play or damage.

Then, a chain cross roller bearing which can completely overcome the above problem has been completed by improving a circulating cross roller bearing along with the study in developing the press die set of this invention.

Embodiments of the chain cross roller bearing will be described in the following.

Embodiment 3

Figure 8:
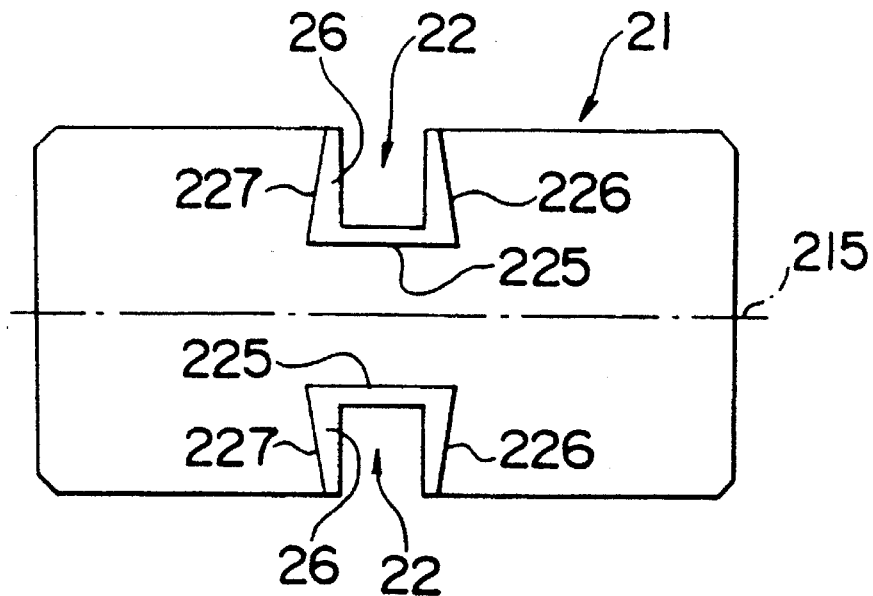
FIG. 8 shows a cross sectional view through the axis of rotation of the roller of an embodiment.

FIG. 8 shows a cross sectional view through the axis of rotation of the roller of the embodiment 3. The bottoms 225 of circumferential groove 22 are equidistant from the axis of rotation 215 and constitute the sides of the column, the axes of rotation of which are common. The sides 226 and 227 of the circumferential groove 22 are not normal to the axis of rotation 215, and are beveled to form an acute angle to the bottom 225. That is, the sides 226 and 227 of the circumferential groove 22 form sides of cones the axes of rotation of which are common. The width of the circumferential groove 22 becomes widened from the surface to the inside. Resin 26 is coated on the surface of the circumferential groove 22 in such a manner that the coated surface has a substantially constant width. In this embodiment, a nylon type resin is coated with little peeling-off during use of the roller.

In the above embodiment, first, because the surface of the circumferential groove of the roller is coated with resin, it is possible to reduce wear between the circumferential groove of the roller and the support ring of the coupling link, and to suppress generation of metal powder. However, if the resin is merely coated, the resin is peeled off during continuous use of the roller bearing so that the above effect is lost. Thus, the applicant studied the surface configuration of the circumferential groove of the roller from which the resin is difficult to peel off, thus leading to the above embodiment.

Embodiment 4

Figure 9:
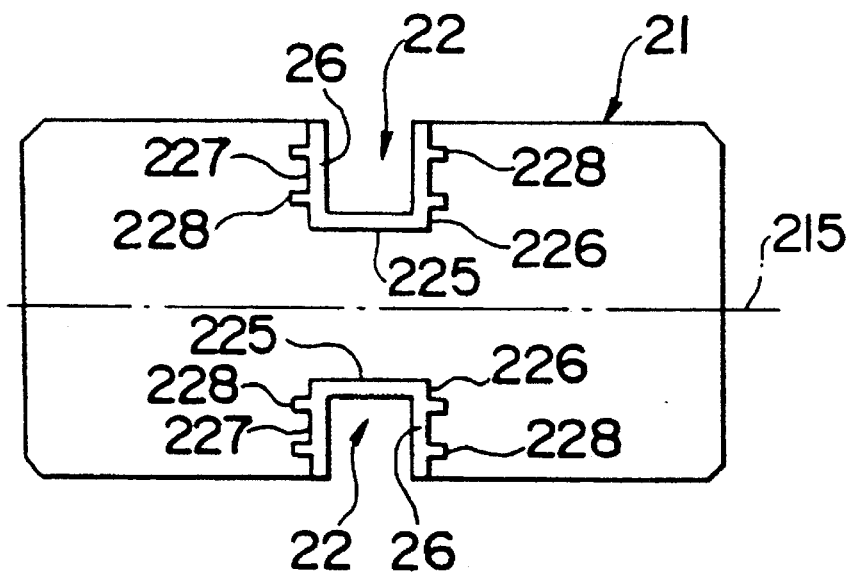
FIG. 9 shows a cross sectional view through the axis of rotation of the roller of an embodiment.

FIG. 9 shows a cross sectional view through the axis of rotation of the roller of the embodiment 4. The bottoms 225 of the circumferential groove 22 are also equidistant from the axis of rotation 215, and constitute the sides of a column the axes of rotation of which are common. The sides 226 and 227 of a circumferential groove 22 are substantially planar normal to the axis of rotation and form a circular groove 228 around the axis of rotation. Resin 26 is coated on the surface of the circumferential groove 22. The resin 26 also flows into a circular groove 228 formed in the sides 226 and 227 of the circumferential groove 22. When the resin 26 is solidified, the resin filled in the circular groove 228 exhibits an anchor effect so that the resin is difficult to peel off.

In addition, in the above embodiment, because the surface of the support ring of the coupling link is lubricant treated, wear is reduced between the circumferential groove of the roller and the support ring of the coupling link so that generation of metal powder is suppressed.

In any embodiments for the press die set, the guide bush performs pure linear motion copying the second plane or the second plane and the second right angle groove provided on the inner surface of the guide bush along the first plane or the first plane and the first right angle groove provided in parallel to the central axis of the guide post through the plain roller bearing or the plain roller bearing and the cross roller bearing. Then, this motion is caused by a rolling movement between the rollers of the plain roller bearing or the rollers of the plain roller bearing and those of the cross roller bearing, and the first plain or the first plain and the first right angle groove provided on the guide post as well as the second plain and the second plain of the second right angle groove provided on the guide bush so that very high accuracy, abrasion resistance, and impact resistance are provided.

Figure 13:
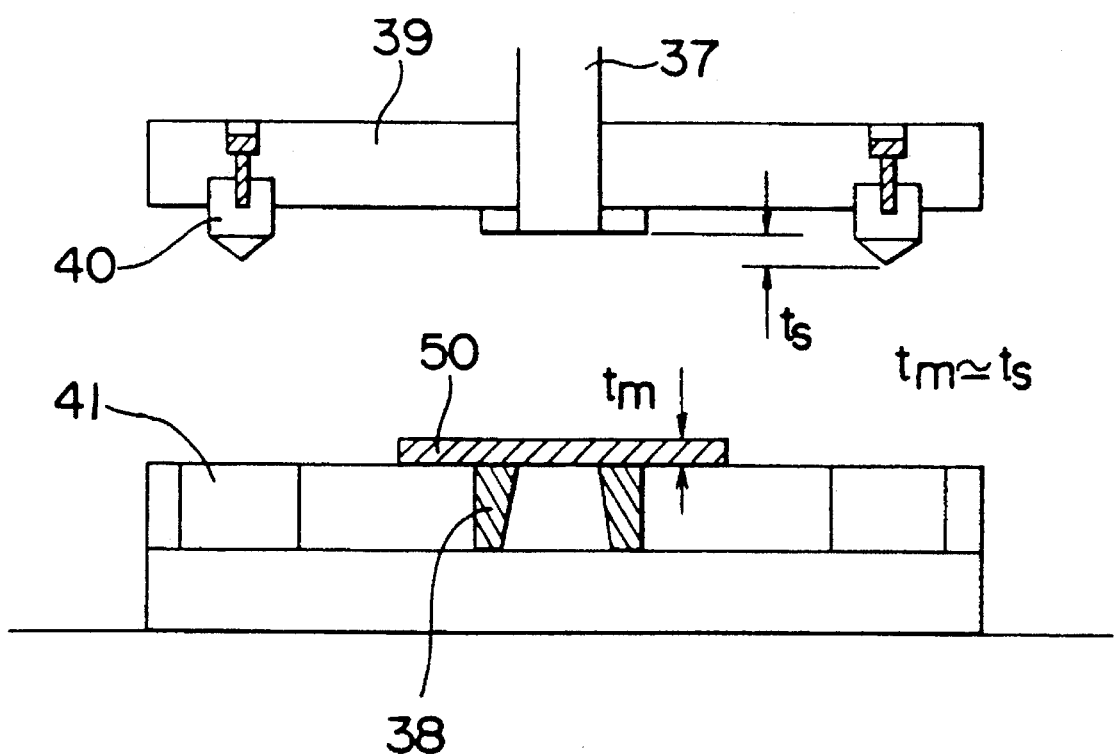
FIG. 13 shows a front cross sectional view of a press die set of an embodiment.
Figure 14:
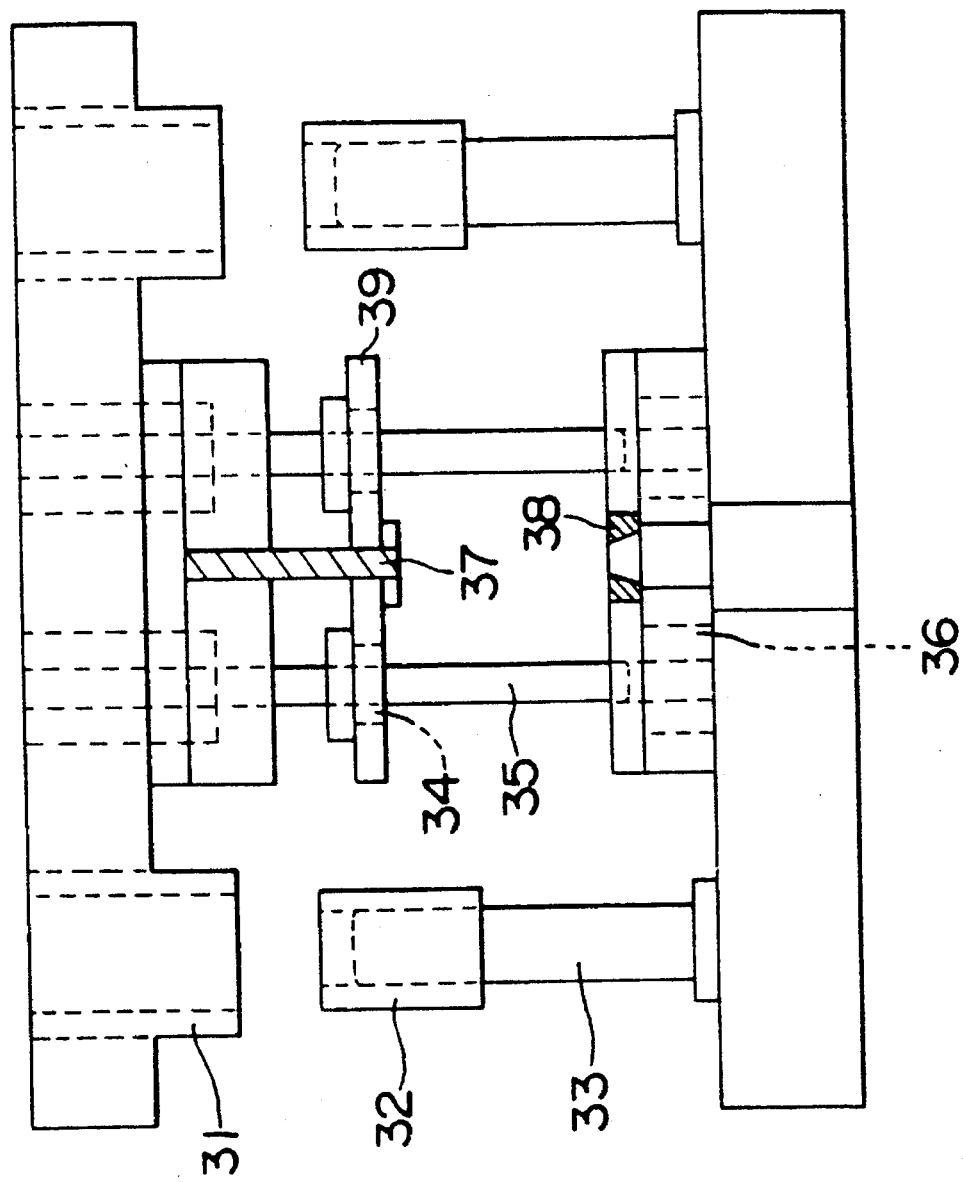
FIG. 14 shows a front cross sectional view of a conventional press die set.
Figure 15:
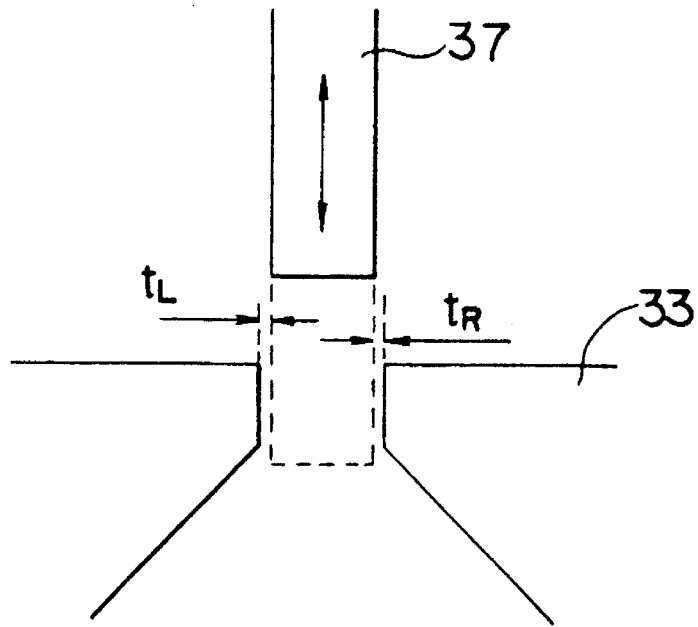
FIG. 15 shows a front cross sectional view illustrating the relationship between a trimming punch blade and a trimming die button.
Figure 16:
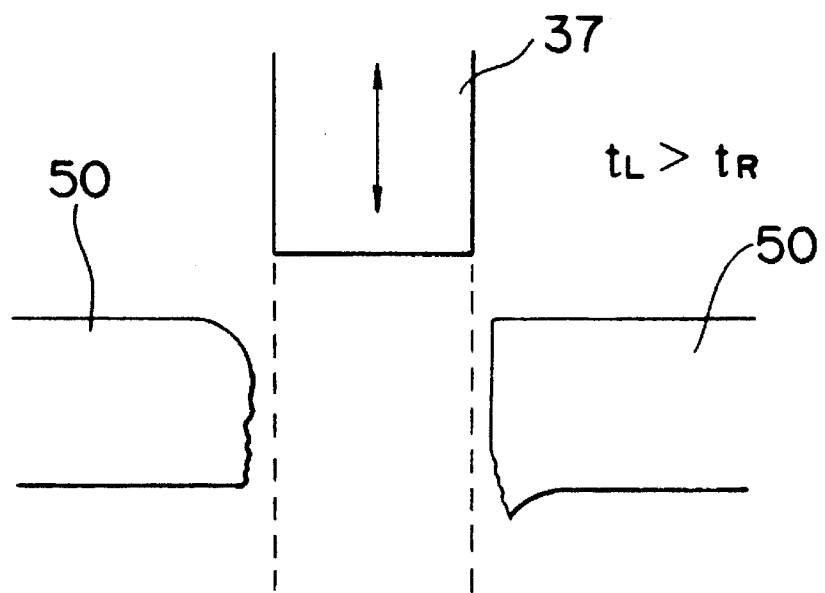
FIG. 16 shows a front cross sectional view illustrating the relationship a trimming punch blade and a blanking defect in a work.

FIG. 13 shows a front cross sectional view of the stripper of an embodiment 5. A trimming punch blade 37 is incorporated at the center of a stripper 39 for vertical movement. The lower plate is mounted with a trimming die button 38 in correspondence to the trimming punch blade. A work 50 is placed on it. Although not shown in the figure, similar to FIG. 14, mounted at the periphery of the stripper is a stripper guide bush into which a stripper guide pin is inserted. Spike-like projections 40 are mounted on the periphery of the stripper at locations where the stripper guide bush is not mounted. In this embodiment 5, the front end of the spike-like projection 40 is conical, the surface of which may be modified for conventional antislipping measures on its surface such teeth as in a bevel gear, spot-like projections, or dimple-like recesses. Material used may include metal, sintered metal, plastics, ceramics, hard rubber, or resin. Thread is provided in the other end of the spike-like projection 40 for screw fitting to the stripper 39. By screwing the spike-like projection, the hight of the projection can be fine adjusted. The height tS from the face of the trimming punch blade 37 in the normal state to the end of the spike-like projection 40 may be equal to or slightly smaller than the thickness tM of the work. The lower plate is embedded with resilient material 41 at a location corresponding to the spike-like projection 40. The resilient material may include natural rubber, synthetic rubber, hard plastics, or foamed styrol.

Figure 17:
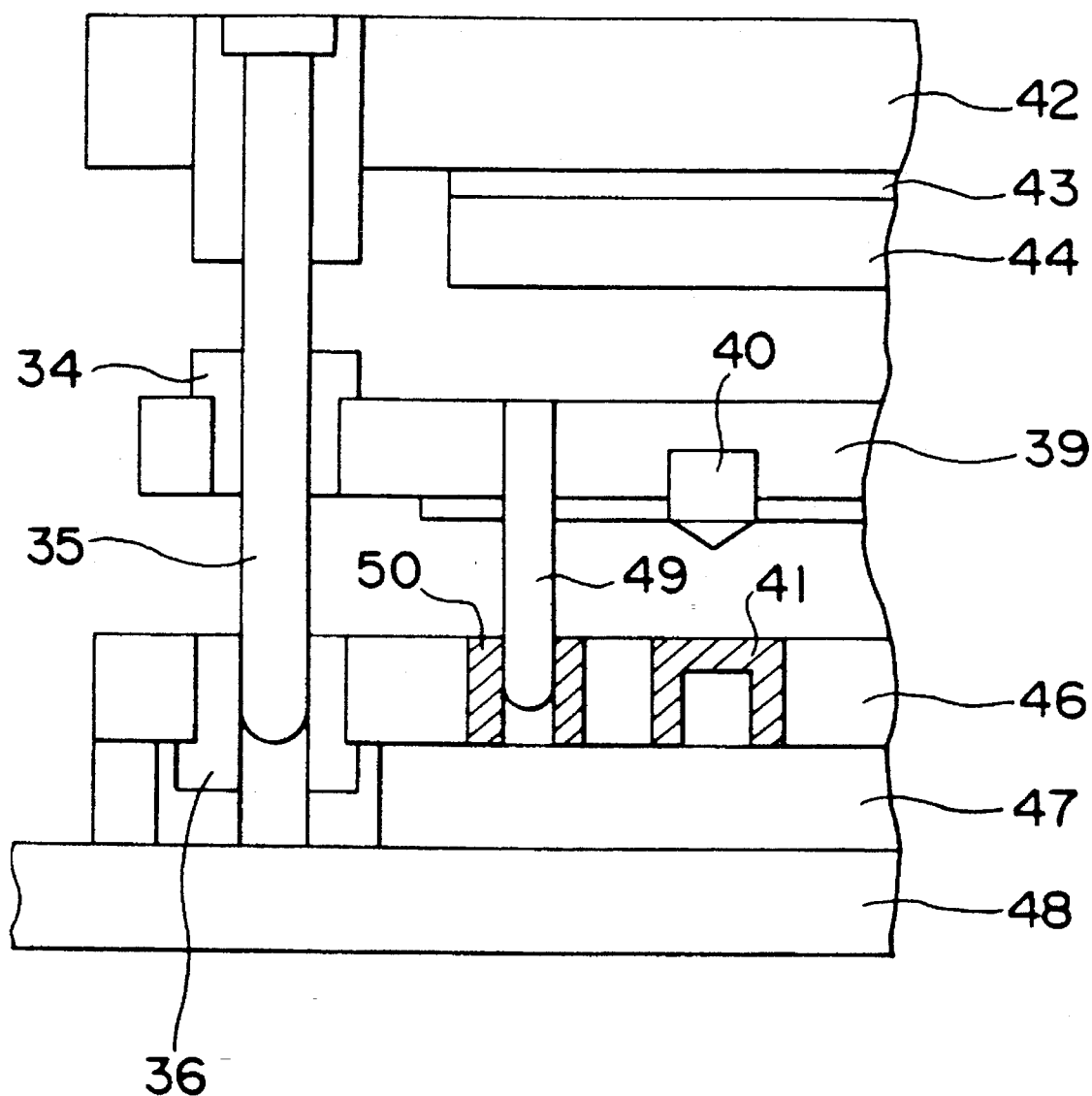
FIG. 17 shows a front cross sectional view of a press die set of an embodiment.

FIG. 17 shows a front cross sectional view of the stripper of embodiment 6. Similar to embodiment 5, spike-like projections 40 with conical end are mounted on the stripper 39, while the resilient material 41 is embedded in a die plate 46 at locations corresponding to the spike-like projections 40. The stripper is mounted near the spike-like projection 40 and the resilient material 41 with a columnar sub-guide pin projecting downwardly. Then, a cylindrical sub-guide bush 51 is embedded in the die plate 46 at location corresponding to the sub-guide pin 49. The sub-guide pin 49 and the sub-guide bush 51 slide in a mated state. The sub-guide pin 49 is mounded on the stripper 39 rather than the punch holder 42 so that a mounting position can be easily selected, and a number of them can be mounted. Furthermore, because the length of the sub-guide pin 49 is shorter than that of the stripper guide pin, the sub-guide pin 49 itself has small flex deformation. In addition, because the fixed section is close to the sliding section, it is possible to keep small deflection in the X- and Y- directions during sliding. Material used for the sub-guide pin may include sintered hard alloys and ceramics in addition to tool steel, high speed steel, and stainless steel. In particular, use of ceramics or sintered hard alloys is desirable because they are difficult to damage and are excellent in abrasion resistance.

Embodiment 7

Figure 19:
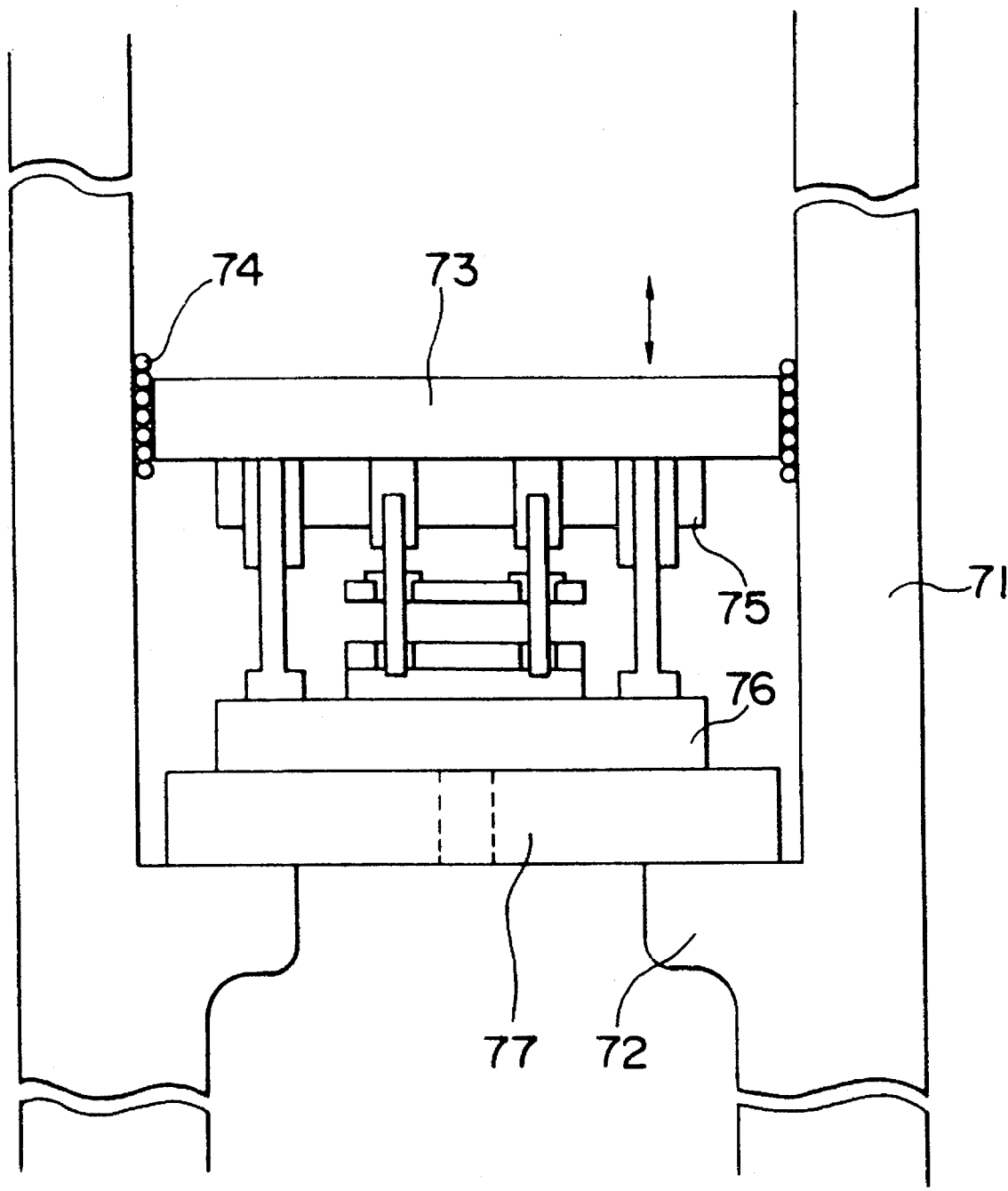
FIG. 19 is a schematic view of a press machine of an embodiment.

FIG. 19 shows a schematic view of the press die set of the embodiment 7, and a press machine for driving it.

The press machine comprises a frame 71, a receiver 72 horizontally and inwardly projecting from the frame, a bolster 77 placed across the receiver 72, a ram 73 vertically and repeatedly moving on the bolster, and a bearing 74 interposed between the end surface of the ram 73 and the sliding face of the frame 71. A through hole for dropping and discharging press chips is provided at the center of the bolster 77. The bolster 77 and the ram 73 are provided for absorbing vibration from the press machine, for absorbing heat from the press machine, and for preventing deflection of the components themselves. First, iron rods are placed with space on both sides, and other iron rods are placed perpendicular to them. Their intersections are bound with wire. Iron rods are further assembled in the vertical direction to form a framework. At the same time, an iron block is positioned at a position where the thread for coupling the press die set is cut to form the outer and the inner frames forming the shell. Epoxy resin concrete from Nippon Graphite Co., Ltd. is then flowed into the shell and left to solidify for a predetermined period of time. Thereafter, the outer and the inner frames are removed, burrs are removed, and grinding is conducted to obtain high accuracy on the surface. Moreover, the thread is cut at the predetermined position of the embedded iron block.

The press die set includes the die holder 76 and the punch holder 75, for which iron blocks are also embedded in the epoxy resin concrete to form a core for the iron mesh and a bush mounting hole (collar). The concrete is then solidified. Similarly, the outer and the inner frames are removed, burrs are removed, and the surface is ground. For the die holder 76, a hole for embedding and securing the base of the guide post is precisely machined in an iron block which is embedded in advance. In addition, the punch holder 75 is precisely worked with a hole for fitting and bonding the guide bush. Then, the die holder 76 is placed at a predetermined position on the bolster 77, and secured with screws or bolts. Similarly, the punch holder 75 is secured at a predetermined position on the bottom surface of the ram 73 with screws or bolts.

Embodiment 8

Figure 18:
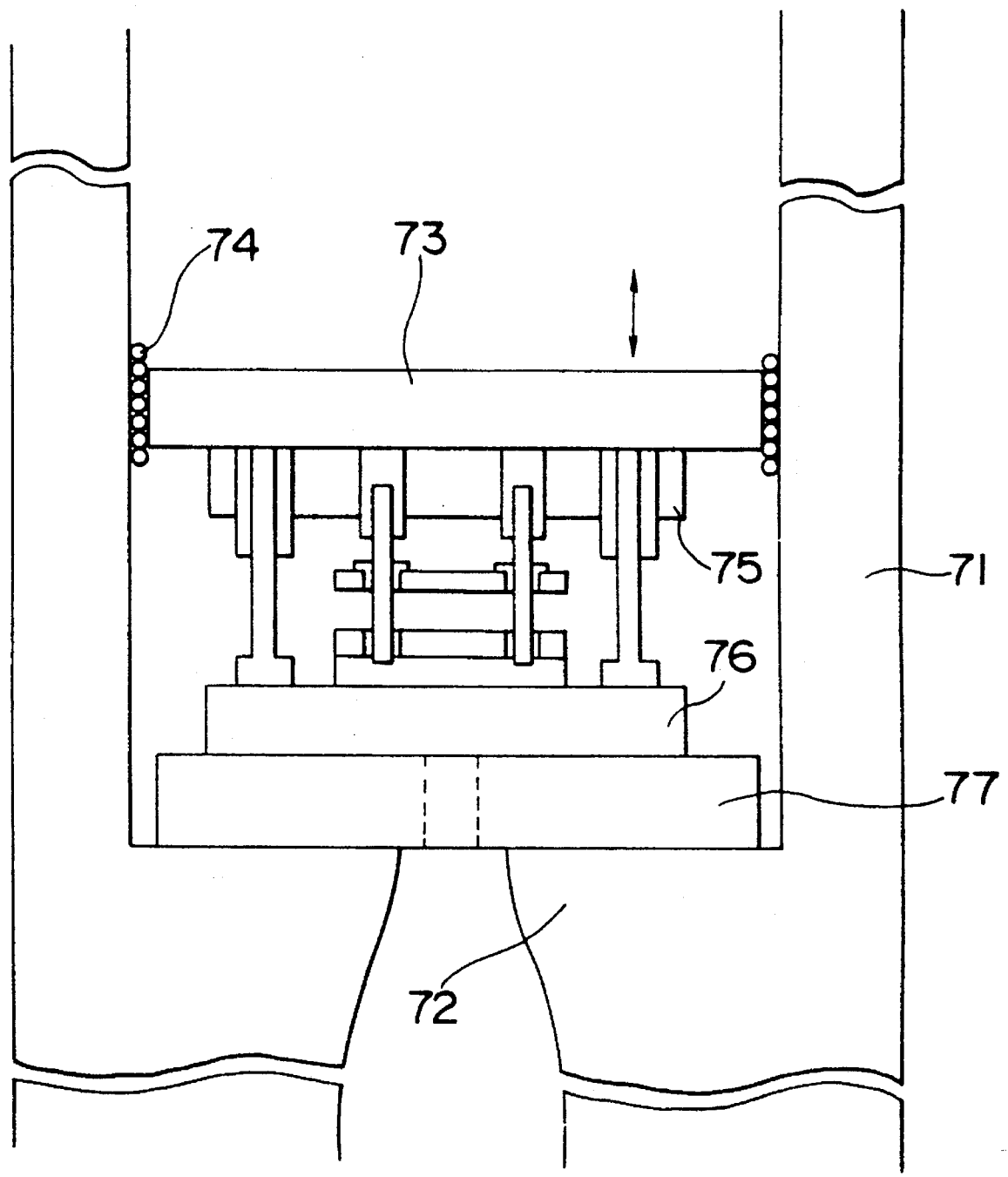
FIG. 18 is a schematic view of a press machine of an embodiment.

FIG. 18 shows a schematic view of the press die set of the embodiment 8, and a press machine for driving it. While the embodiment 7 has the receiver 72 of the press machine in a typical shape, the embodiment 2 has a receiver 72 which has a small area for the central space and, if possible, a small space allowing press chips to drop. In addition, the receiver 72 is arranged to have a wall thickness significantly thicker than a conventional one.

We claim:

1. A chain-like cross roller bearing in which a number of rollers are rotatably coupled, each roller being provided with a circumferential groove at the center in the direction of the axis of rotation, the surface of circumferential groove of which is coated with resin and the surface of the circumferential groove is worked into a shape preventing the peeling-off of the resin, the circumferential groove of the roller being rotatably fitted with a support ring which is formed at the center of the coupling link, and a coupling ear provided at each side of the support ring coupling adjacent to the coupling links so that each roller is coupled so as to be orthogonal with each other.

2. A chain-like cross roller claimed in claim 1, wherein the sides of the circumferential groove of each roller are beveled with each other to make the angle between the side and the bottom of the circumferential groove an acute angle.

3. A chain-like cross roller claimed in claim 1, wherein it is formed with a recess in a shape and size into which resin flows in the side or bottom of the circumferential groove of each roller to exhibit an anchor effect.

4. A chain-like cross roller bearing in which a number of rollers are rotatably coupled, each roller being provided with a circumferential groove at the center in the direction of the axis of rotation, the circumferential groove of the roller being rotatably fitted with a support ring which is formed at the center of the coupling link, and surface treated for lubrication, and a coupling ear provided at each side of the support ring coupling adjacent to the coupling links so that each roller is coupled so as to be orthogonal with each other.

* * * * *

UNITED STATES PATENT AND TRADEMARK OFFICE
CERTIFICATE OF CORRECTION

PATENT NO. : 5,620,258

DATED : April 15, 1997

INVENTOR(S) : Enomoto et al.

It is certified that error appears in the above-identified patent and that said Letters Patent is hereby corrected as shown below:

First Page, First Column, Front Page of Patent, after "Nobuo Enomoto" insert --Kazuo Yamada--.

Signed and Sealed this

Eighteenth Day of November 1997

Attest:

BRUCE LEHMAN

*Attesting Officer*   *Commissioner of Patents and Trademarks*